(12) United States Patent
Yuda et al.

(10) Patent No.: US 6,504,323 B2
(45) Date of Patent: Jan. 7, 2003

(54) HIGH PRESSURE DISCHARGE LAMP DRIVING APPARATUS, LUMINAIRE AND HIGH PRESSURE DISCHARGE LAMP DRIVING METHOD

(75) Inventors: Tokuji Yuda, Kanagawa-ken (JP); Junichi Katoh, Kanagawa-ken (JP)

(73) Assignee: Harison Toshiba Lighting Corp., Imabari (JP)

( * ) Notice: Subject to any disclaimer, the term of this patent is extended or adjusted under 35 U.S.C. 154(b) by 0 days.

(21) Appl. No.: 09/910,718

(22) Filed: Jul. 24, 2001

(65) Prior Publication Data

US 2002/0074955 A1 Jun. 20, 2002

(30) Foreign Application Priority Data

Jul. 26, 2000 (JP) ..................................... P2000-226067
May 30, 2001 (JP) ..................................... P2001-162593

(51) Int. Cl.[7] .......................... H05B 37/02; H05B 39/04
(52) U.S. Cl. ....................... 315/307; 315/176; 315/224; 315/246
(58) Field of Search ................................. 315/307, 308, 315/176, 224, 246, 291

(56) References Cited

U.S. PATENT DOCUMENTS

| | | | | |
|---|---|---|---|---|
| 5,463,287 A | * | 10/1995 | Kurihara et al. ............ | 315/308 |
| 6,005,356 A | * | 12/1999 | Horiuchi et al. ............ | 315/307 |
| 6,127,789 A | * | 10/2000 | Ishizuka et al. ............ | 315/308 |
| 6,125,252 A1 | * | 4/2001 | Stanton ....................... | 315/224 |
| 6,225,754 B1 | * | 5/2001 | Horiuchi et al. ............ | 315/246 |

* cited by examiner

Primary Examiner—Don Wong
Assistant Examiner—Hoang Nguyen
(74) Attorney, Agent, or Firm—Pillsbury Winthrop LLP

(57) ABSTRACT

Disclosed a high pressure discharge lamp driving apparatus for driving a high pressure discharge lamp during a stable operation thereof with an AC lamp current alternating for opposite half-cycle periods, the apparatus comprising an AC lamp current supply for supplying the AC lamp current to the high pressure discharge lamp, a detector for detecting the output AC lamp current to the high pressure discharge lamp, a controller responsive to the detector for controlling the AC supply to output the AC lamp current with a waveform which is characterized by that (i) a mean value in the second half of each half-cycle period is larger than the means value of the first half of each half-cycle period, (ii) no pulse current is contained in the second half of each half-cycle period, (iii) the AC lamp current has a maximum value immediately after polarity change between the positive and negative half-cycle periods, and (iv) the AC lamp current has also a waveform defined by that the ratio (d/a) of the maximum value (d) of the AC lamp current and a mean value (a) of the AC lamp current in its each half-cycle period satisfies a following equation.

$$1.05 \leq d/a \leq 1.80$$

15 Claims, 12 Drawing Sheets

HIGH PRESSURE DISCHARGE LAMP DRIVING APPARATUS, LUMINAIRE AND HIGH PRESSURE DISCHARGE LAMP DRIVING METHOD

FIELD OF THE INVENTION

The present invention relates to a high pressure discharge lamp driving apparatus, a luminaire and high pressure discharge lamp driving method.

BACKGROUND OF THE INVENTION

PCT application Japanese laid-open patent Toku-Hyo-Hei 10-501919 (PCT/ID95/00392) discloses an apparatus and method for driving a high pressure discharge lamp with an AC lamp current, wherein a pulse current is generated in a predetermined fraction of a half-cycle period of lamp current, and the polarity of the pulse current is made the same as the lamp current, then the pulse current is superposed on the lamp current in the second half of each half-cycle period where it is generated.

It is also described that good results may be achieved when the ratio between the mean amplitudes of the pulse current and the lamp current is in the range of 0.6 to 2, and the ratio between the duration of the pulse current and the half-cycle period of the lamp current is in the range of 0.05 to 0.15.

In the prior art as described above, since the total amount of current flowing through the high pressure discharge lamp increases at the end of a predetermined fraction of the half-cycle period of the lamp current by the pulse current, the electrode temperature rises to a relatively higher value. The high temperature enhances the stability of a discharge arc because the discharge arc originates from the same place on the electrode in each cathodic phase.

However, in the case of prior art, when the pulse current flows, the current temperature rises relatively high only for a short time, so that an emitted light also increases remarkably. Accordingly, the prior art has a drawback that a rapid change of the output amounts of light by superposing the pulse current on the lamp current causes flickering of color or brightness on a picture even if for a short time, in case of using a light emitted for extremely short time such as the digital light processing (trade name; "DLP") system which obtains a color picture by superposing the RGB three-primary-color picture by timesharing and then projecting the picture by utilizing a revolving RGB color filter and a digital micro-mirror device (trade name; "DMD").

Therefore, the prior art could not achieve an operation or effect of reducing the flickering of the output amounts of light in regard to a usage pattern of the output amounts of light.

Also, in the prior art, an electrode substance tends to be exhausted by sputtering when the electrode is heated by superposed on the pulse current. Therefore, the prior art has another drawback that since the inner surface of a translucent discharge bulb is blackened to decrease the transparency of the bulb, the life of the high pressure discharge lamp is shortened as the output amounts of light decreases.

SUMMARY OF THE INVENTION

An object of the present invention is to provide a high pressure discharge lamp driving method, a high pressure discharge lamp driving apparatus, and a luminaire utilizing the high pressure discharge lamp driving apparatus, which decrease the a fluctuation of emitted light in half-cycle period of the lamp current, so as to control flickering of the output amounts of light.

According to a first aspect of the invention, there is provided a high pressure discharge lamp driving apparatus for driving a high pressure discharge lamp during a stable operation thereof with an AC lamp current alternating for opposite half-cycle periods, the apparatus comprising:

an AC lamp current supply for supplying the AC lamp current to the high pressure discharge lamp;

a detector for detecting the output AC lamp current to the high pressure discharge lamp;

a controller responsive to the detector for controlling the AC supply to output the AC lamp current with a waveform which is characterized by that;

(i) a mean value in the second half of each half-cycle period is larger than the means value of the first half of each half-cycle period;

(ii) no pulse current is contained in the second half of each half-cycle period;

(iii) the AC lamp current has a maximum value immediately after polarity change between the positive and negative half-cycle periods; and (iv) the AC lamp current has also a waveform defined by that the ratio (d/a) of the maximum value (d) of the AC lamp current and a mean value (a) of the AC lamp current in its each half-cycle period satisfies a following equation.

$$1.05 \leq d/a \leq 1.80$$

In the first aspect of the invention, it is possible to heat the electrode fully to the very end part of the second half of the half-cycle period. As a result, it is possible to keep the electrode temperature high to a required level in the next half-cycle period after the polarity fluctuation of the lamp current. Accordingly, when an action of electrode has switched from an anodic phase to a cathodic phase, it is controlled that a cathode spot moves over the electrode surface, thus the stability of the discharge is enhanced.

Also the instantaneous fluctuation of the output amounts of light is remarkably decreased. Thus, even in case of using the high pressure discharge lamp that is operated according to the first aspect of the invention in the digital light processing system, flickering of brightness or color will be hardly produced.

Furthermore, it is hard to produce a sputtering of the electrode substance caused by the electrode pulse at about the end of half-cycle period, so that the life of the high pressure discharge lamp is improved.

According to the second aspect of the present invention, there is provided a luminaire comprising a lamp driving unit main body and a high pressure discharge lamp driving apparatus mounted on the luminaire main body, wherein the driving apparatus is configured in a manner as defined in the second aspect of the invention.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DEFINITION OF TECHNICAL TERMS

Figure 1:
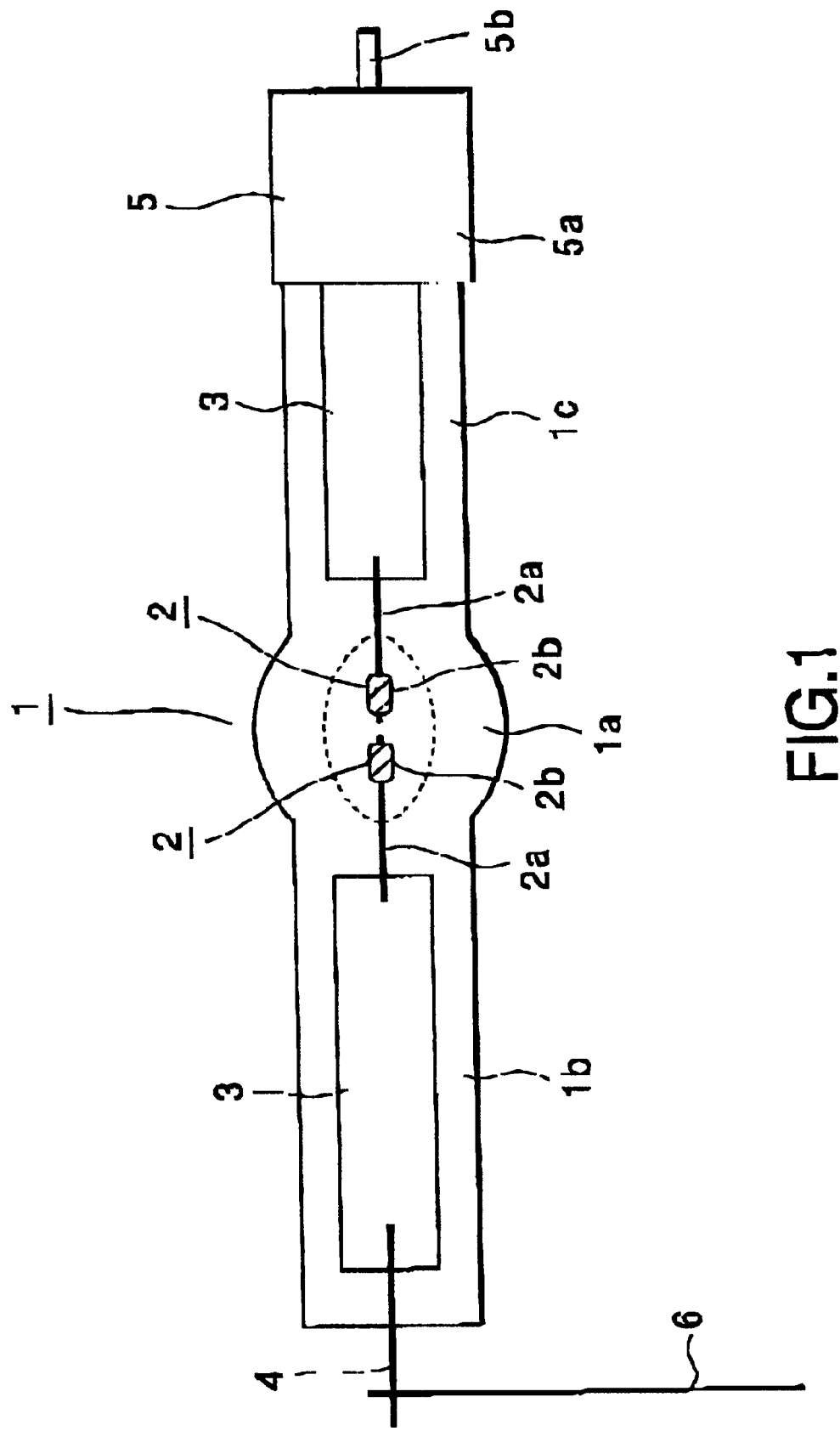
FIG. 1 is a front view showing the high pressure discharge lamp in which a first aspect of embodying the high pressure discharge lamp driving method according to the present invention is performed.

In the following descriptions, some definitions and their technical meanings are presented for following specific terms, unless otherwise specified.

High Pressure Discharge Lamp

The high intensity discharge lamp is provided with a translucent discharge bulb, a pair of electrodes, and a discharge agent at least.

The translucent discharge bulb is comprised of a material that has a refractoriness and airtihgtness such as a silica glass or a translucent ceramics.

A pair of electrodes are sealed inside of the translucent discharge bulb, and spaced apart in facing each other.

In order to enhance the condensation of the light that is generated by the discharge, it is desirable to shorten the distance between electrodes. The discharge agent is an agent which ionizes to contribute for discharge operation, and it is able to be selected from a metal halide, a mercury, or rare gases. For instance, in a metal halide lamp, it is able to use a metal halide of a luminous metal, and a mercury or rare gases as buffer gases, or it is also able to use a combination of metal halides of a metal having a relatively high vapor pressure and less radiative such as a zinc, an iron, or an aluminum in place of the mercury. Also in a high pressure mercury lamp, the mercury and the rare gas are used. Further, in a rare gas discharge lamp, a rare gas such as a xenon is used.

AC Lamp Current

The AC lamp current drives the high pressure discharge lamp by flowing through the high pressure discharge lamp.

DC Power Supply

The DC power supply may be any of a battery power supply and a rectified DC power supply. The rectified DC power supply generates a DC current by rectifying a low-frequency AC power supply such as a business AC power supply in a rectifier means. The rectifier means may be any of a half-wave rectifier or a full-wave rectifier. The rectified output may be smoothed further, or not be smoothed to be output.

DC to DC Converter

The term "DC to DC converter" means a means for converting the DC output of a DC power supply into a DC voltage with a desirable voltage. In order to perform the DC to DC conversion, for instance, the DC is converted into a high frequency pulse with a desirable voltage first, and then the high frequency pulse is rectified to be converted into a DC voltage with a desirable voltage. There are various kinds of circuit system known as the DC to DC converter using the converting system mentioned above. Basically, it is allowable for any circuit system. For example, it may use a circuit system such as a chopper type, a forward type, a push-pull type, and a bridge type. A chopper type DC to DC converter may be any one of a step-down type, a step-up type, and a reverse-polarity type.

Luminaire

The term "luminaire" has wide varieties of concept including any devices using a light of the high pressure discharge lamp. Thus, it is applied to a light projection device such as a liquid crystal projector or an overhead projector, a mobile headlight, a lighting equipment, or a display system. Of course, the light equipment may be used as an indoor or outdoor. Here, the term "lamp driving unit main body" designates a whole portion of the luminaire except the high pressure discharge lamp. Now, the lamp driving circuit in the high pressure discharge lamp driving apparatus may be separated from the luminaire main body.

GENERAL ASPECTS OF THE INVENTION

A high pressure discharge lamp driving apparatus according to the first aspect of the present invention drives a high pressure discharge lamp during a stable operation thereof with an AC lamp current alternating for opposite half-cycle periods, the apparatus comprising an AC lamp current supply for supplying the AC lamp current to the high pressure discharge lamp, a detector for detecting the output AC lamp current to the high pressure discharge lamp, a controller responsive to the detector for controlling the AC supply to output the AC lamp current with a waveform which is characterized by that (i) a mean value in the second half of each half-cycle period is larger than the means value of the first half of each half-cycle period, (ii) no pulse current is contained in the second half of each half-cycle period, (iii)

the AC lamp current has a maximum value immediately after polarity change between the positive and negative half-cycle periods, and (iv) the AC lamp current has also a waveform defined by that the ratio (d/a) of the maximum value (d) of the AC lamp current and a mean value (a) of the AC lamp current in its each half-cycle period satisfies a following equation.

$$1.05 \leq d/a \leq 1.80$$

The lamp current is characterized by that the mean value in the second half of each half-cycle period of its waveform, i.e., in the second one-fourth of a period is larger than the mean value of the first half of each half-cycle period, i.e., the first one-fourth of the period. Here it is allowable that the difference of both mean values is in the range of about 5 to 50%. However, a good result is achieved when the difference is in the rage of 10 to 30%. Here, the mean value of the waveform of the lamp current is obtained by integrating the waveform. Also, the term, "lamp current" means all the currents flowing through a pair of electrodes of the high pressure discharge lamp, and it is not asked from which circuit it is outputted. Furthermore, it is preferable that the basic waveform of the lamp current is rectangle waveform.

Also, the lamp current is characterized by that it does not include the pulse current in the second half of each half-cycle period. Therefore, the lamp current has a relatively small fluctuation of its instantaneous value in the second half of each half-cycle period. For instance, it permits of the instantaneous value from beginning to end of the second half of each half-cycle period could be a mode which is almost fixed, a mode which goes up almost linearly, a mode which goes up gradually, a mode which goes up while being saturated, and a mode which goes up with a slope growing larger. Here, in case of that the lamp current contains high frequency ripples, the fluctuation of the lamp current is judged based on its envelope.

Further, it is desirable that the lamp current has been so controlled that its instantaneous value does not decrease for at least one-eighth at the end of each half cycle period.

A suitable maximum value for stabilizing the lamp operation voltage by the ratio of the maximum value and the mean value is also defined. That is, when the ratio d/a is less than 1.05, the stabilization of the lamp operation voltage is deteriorated. On the other hand, the ratio d/a is larger than 1.8, the flickering of the output amounts of light is easy to occur. Thus, the ratio d/a is preferable to be in the range of 1.3 to 1.6.

A high pressure discharge lamp driving apparatus according to the second aspect of the present invention is characterized by further that the AC lamp current has a maximum value immediately after polarity change It is desirable that the peak value of the AC lamp current is formed by a pulse. The pulse immediately after polarity changes may be easily created according to transient phenomena of the lamp driving circuit causing at the polarity changes.

Then, in the present invention, the lamp operation voltage of the high pressure discharge lamp is stabilized by that the AC lamp current has the maximum value immediately after the polarity change. The fluctuation of the lamp operation voltage causes flickering of brightness. That is, the stabilization of the lamp operation voltage reduces the flickering of brightness.

A high pressure discharge lamp driving apparatus according to the third aspect of the present invention is characterized by further that the AC lamp current has the minimum value at the first half of half-cycle period.

In the present invention, since the AC lamp current has the minimum value at the first half of half-cycle period, it is easy to make the mean value in the second half of each half-cycle period greater than that in the first half relatively.

A high pressure discharge lamp driving apparatus according to the fourth aspect of the present invention drives a high pressure discharge lamp during a stable operation thereof with an AC lamp current alternating for opposite half-cycle periods, the apparatus comprising:

an AC lamp current supply for supplying the AC lamp current to the high pressure discharge lamp;

a detector for detecting the output AC lamp current to the high pressure discharge lamp;

a controller responsive to the detector for controlling the AC supply to output the AC lamp current with a waveform which is characterized by that;
(i) a mean value in the second half of each half-cycle period is larger than the means value of the first half of each half-cycle period;
(ii) no pulse current is contained in the second half of each half-cycle period;
(iii) the AC lamp current has a maximum value immediately after polarity change between the positive and negative half-cycle periods; and
(iv) the AC lamp current has also a waveform defined by that the ratio (a/b) of a mean value (a) of the AC lamp current in its half-cycle period and the minimum value (b) satisfies a following equation.

$$1.1 \leq a/b \leq 4.0$$

In the high pressure discharge lamp driving apparatus, by providing the ratio a/b between the minimum value b of the first half of each half-cycle period of the AC lamp current and the mean value a in a half-cycle period, it heats the electrode to the end of the second half of each half-cycle period more than that in the first half so as to increase the electrode temperature up to the desirable degree. When the value a/b is less than 1.1, the heating of the electrode in the second half of each half-cycle period is lowered. On the other hand, when the value a/b increases over 4.0, the heating of the electrode in the second half becomes excessive. Also, the lamp current becomes easily changed rapidly at the change from the first half to the second half, thus, it causes a flickering of output light for a short time. Thus, the ratio a/b is preferable to be in the range of 1.1 to 1.7.

Accordingly, in the high pressure discharge lamp driving method according to this aspect of the invention, it is able to achieve almost same function and effect as those in that of the first aspect of the invention.

A high pressure discharge lamp driving apparatus according to the fifth aspect of the present invention drives a high pressure discharge lamp during a stable operation thereof with an AC lamp current alternating for opposite half-cycle periods, the apparatus comprising:

an AC lamp current supply for supplying the AC lamp current to the high pressure discharge lamp;

a detector for detecting the output AC lamp current to the high pressure discharge lamp;

a controller responsive to the detector for controlling the AC supply to output the AC lamp current with a waveform which is characterized by that;
(i) a mean value in the second half of each half-cycle period is larger than the means value of the first half of each half-cycle period;
(ii) no pulse current is contained in the second half of each half-cycle period;

(iii) the AC lamp current has a maximum value immediately after polarity change between the positive and negative half-cycle periods; and (iii) the AC lamp has also a waveform defined by that the ratio (c/a) of an instantaneous value (c) of the AC lamp current immediately before its polarity change and a mean value (a) of the AC lamp current in its half-cycle period satisfies a following expression.

$$1.1 \leq c/a \leq 1.5$$

In this aspect of the high pressure discharge lamp driving method, by defining the ratio c/a between the instantaneous value c immediately before polarity change of the AC lamp current and the mean value a in half-cycle period, the electrode is much more heated for around the end of the second half of each half-cycle period than for the first half of the that in the first half so as to increase the electrode temperature up to the desirable temperature. When the value c/a is less than 1.1, the heating of the electrode in the second half is lowered. On the other hand, when the value c/a increases over 1.5, the heating of the electrode in the second half becomes excessive. Also, the lamp current becomes easily changed rapidly at the change from the first half to the second half of each half-cycle period, thus, it causes a flickering of output light for a short time. Here, the term "the instantaneous value immediately before polarity change" means the instantaneous value of the portion except the steep trailing edge.

Accordingly, in this aspect of the high pressure discharge lamp driving method, it is able to achieve almost same function and effect as those in claim 1.

A high pressure discharge lamp driving apparatus according to the sixth aspect of the present invention is characterized by further the AC lamp current has its maximum value around mid-term of half-cycle period.

Here, the term "around mid-term of half-cycle period" means the time range which expands 10% of the half-cycle period before and after the mid of the half-cycle period. Here, the portion of a maximum value of the AC lamp current may be formed of a continuous waveform portion where the instantaneous value of the lamp current changes gently, or it may be formed of the pulse current. In the case where the maximum value is formed of the pulse current, it is more suitable for e.g., a translucent liquid crystal projection system that does not perform the time sharing than a digital light processing system that uses a light emitting for a short time.

Accordingly, in this aspect of the high pressure discharge lamp driving method, since the electrode temperature starts to rise at an early phase in the half-cycle period, it is able to prevent the flickering of the output amounts of light by maintaining the temperature to the end of half cycle period. The electrode temperature is maintained to the end of half-cycle period if the mean value in the second half of each half-cycle period of the lamp current is larger than the mean value of the first half of each half-cycle period.

A high pressure discharge lamp driving apparatus according to the seventh aspect of the present invention is characterized by further that the ratio d/a of the AC lamp current satisfies a following expression when d represents a maximum value and a represents a mean value over a half-cycle period.

$$1.3 \leq d/a \leq 1.8$$

This aspect of the high pressure discharge lamp driving method provides a suitable range of the radio (d/a) between a maximum value d and a mean value a over a half-cycle period. When the ratio d/a is less than 1.8, the electrode temperature does not rise sufficiently. On the other hand, when the ratio d/a is larger than 1.8, a sputtering of electrode substance increases, and a blackening of the translucent discharge bulb is easy to occur.

A luminaire according to the eighth aspect of the present invention is characterized by that it comprises a lamp driving unit main body; and a high pressure discharge lamp driving apparatus as defined in any one of the first to seventh aspects of the invention which is mounted on the luminaire main body.

EMBODIMENTS OF THE INVENTION

The embodiments of the present invention will be explained hereinafter referring to the attached drawings.

FIG. 1 is showing a front section of the high pressure discharge lamp in the first embodiment of the high pressure discharge lamp driving method according to the present invention.

FIGS. 2a to 2e are waveform diagrams showing acceptable aspects of the AC lamp current in the high pressure discharge lamp driving method.

Figure 3:
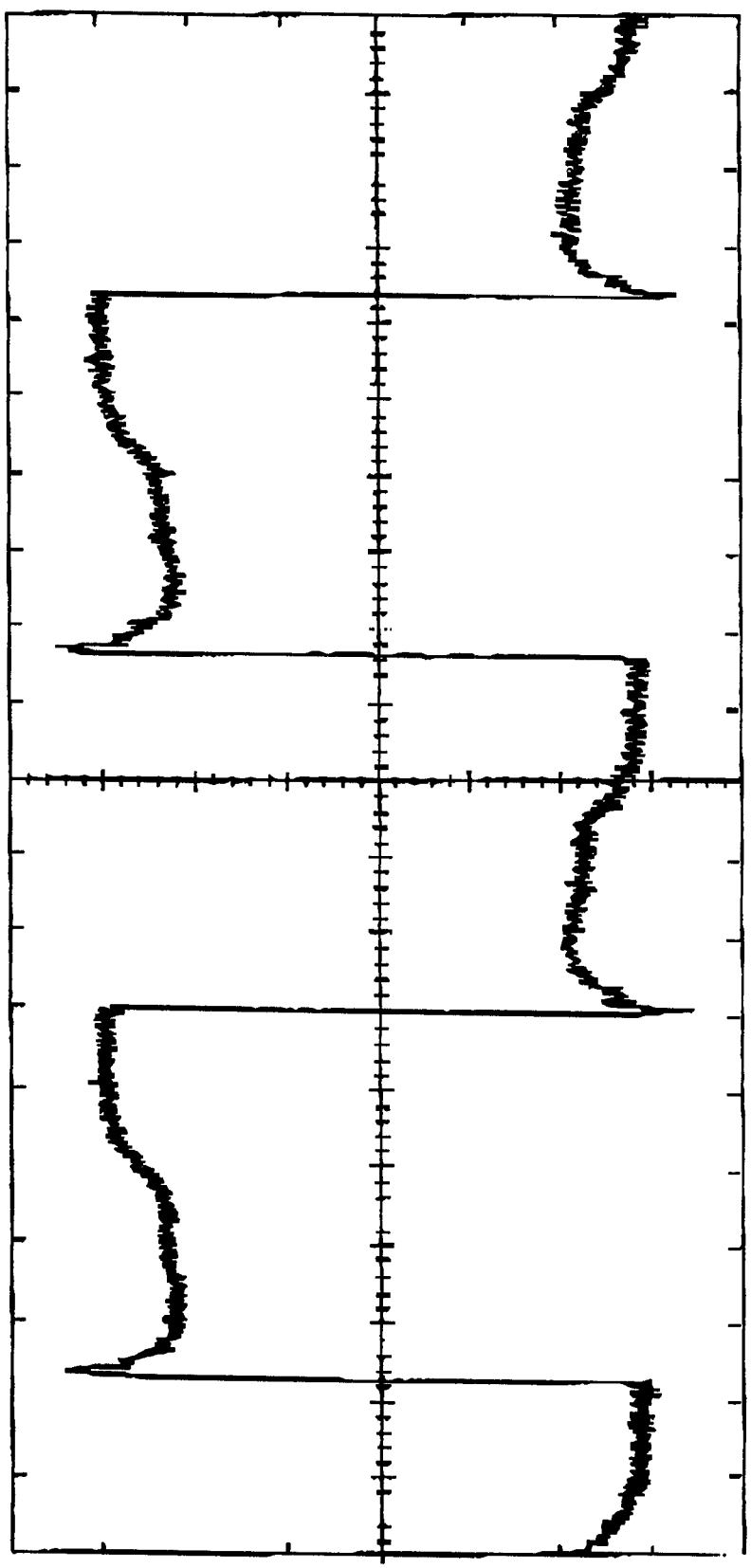
FIG. 3 is a waveform diagram showing the actual AC lamp current corresponding to the aspect, as shown in FIG. 2a in the first embodiment of the high pressure discharge lamp driving method according to the present invention.

FIG. 3 is waveform diagrams showing other acceptable aspects of the AC lamp current in the high pressure discharge lamp driving method.

First, the high pressure discharge lamp will be explained.

In FIG. 1, 1 denotes a translucent discharge bulb, 2 denotes a pair of electrodes, 3 denotes a sealed end metal foil, 4 denotes a lead-conductor, 5 denotes a bulb-base, and 6 denotes a connecting-conductor.

The translucent discharge bulb 1, which is made of a silica glass, is comprised of an envelope 1a at the center and a first and a second reduced pressure portions to be sealed 1b, 1c on both edges of the envelope 1a. The first and the second portions to be sealed 1b, 1c are integrally fabricated on both ends of the envelope 1a in a reduced pressure sealing structure.

The electrode 2 is provided with an electrode axis 2a and a coil portion 2b. The electrode axis is made of a 0.45 mm pure tungsten rod. The coil portion 2b is shaped by winding a 0.15 mm pure tungsten wire at the tip end of the electrode axis 2a. The distance between electrodes is defined to around 1.4 mm.

The sealed end metal foil 3 is made of molybdenum, and the length of sealed portion is 20 mm. The sealed end metal foil 3 forms an electrode amount by welding the base end of the electrode axis 2a to its tip end and the tip end of the feed-conductor to its base end. The electrode mount is laid inside the first and the second reduced pressure portions to be sealed 1b, 1c of the translucent discharge bulb 1 airtightly.

An enclosed agent is comprised of a mercury, an argon, and a CH2Br2.

Here, the halogen of CH2Br2 is filled in the translucent discharge bulb 1, so that its concentration per contents of the envelope 1a of the translucent discharge bulb 1 becomes 8 or more.

The feed-conductor is made of a molybdenum line. Its tip end is welded on the base end of the sealed end metal foil 3, and its base end is exposed outside the first reduced pressure sealed portion 1b. Here, in FIG. 1, the feed-conductor 4 has a right-and left symmetrical structure. Since the right side of the feed-conductor is placed in a bulb-base, it is out of sight.

The bulb-base 5 is provided with a cylinder body 5a and a screw terminal 5b. The cylinder body 5a is made of a metal such as a brass, and its one end is fixed to the end portion of the first reduced pressure sealed portion 1b by a bulb-base cement. The screw terminal 5b, around which the screw slot is defined, protrudes outside the cylinder body 5a by fixing its base end to the cylinder body 5a. Further, it is coupled to the corresponding feed-conductor 4 inside the cylinder body 5a.

A tip end of the coupling conductor 6 is welded to the feed-conductor which is protruded outside the flat sealed portion 1b.

As a result, in the high pressure discharge lamp the rated lamp operation voltage will be 90 V, the rated lamp current will be 1.1 A, and the mercury steam pressure in the discharge agent at the stable condition will be 10 Mpa or more.

Now, an AC waveform will be explained.

Figure 2A:
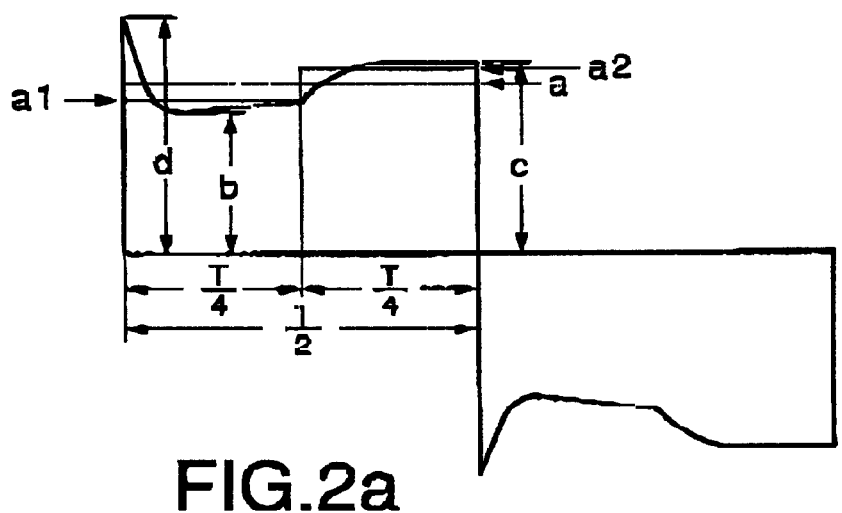
FIGS. 2a to 2e are waveform diagrams showing some acceptable aspects of the AC lamp current in the high pressure discharge lamp driving method.
Figure 2B:

An AC, as shown in FIG. 2a, has a rectangle waveform basically. In FIG. 2a, a denotes the mean value of its half-cycle period, a1 denotes the mean value of the first one-fourth period, and a2 denotes a second one-fourth period under a relation of a1<a2.

First, in the first one-fourth period, it has the maximum value d immediately after polarity change and the minimum value b on about 90 degree/4 phase. By the way, the maximum value d is given by the pulse. Further, the instantaneous value rises gradually from the minimum value b to 90 degree.

Next, in the second half in half-cycle period, the instantaneous value rises as it is saturated for a one-eighth of the period from 90 degree to 135 degree, and it is fixed for another one-eighth period from 135 degree to 180 degree. Further, the instantaneous value has a value c immediately before the polarity change, and the instantaneous value does not decrease for the phase period from 90 degree to 180 degree in the second half of each half-cycle period. Furthermore, the instantaneous value increases or keeps in constant for the period from the time of the minimum value b to the time of the instantaneous value c immediately before polarity change.

By the way, the mean value a, the minimum value b, the instantaneous value c immediately before polarity change, and the maximum value d have relationships as shown below.

$c/a=1.13$ $a/b=1.20$ $d/a=1.39$

FIG. 3 is a waveform diagram showing an actual AC lamp current corresponding to the aspect as shown in FIG. 2a in the first embodiment of the high pressure discharge lamp driving method according to the present invention. In this case, a high frequency ripple by a chopper operation is superposed on the AC lamp current, since the discharge lamp is driven by a high pressure discharge lamp driving apparatus, which will be described later. The mean value a of the AC lamp current, the minimum value b, the instantaneous value c immediately before polarity change, and the maximum value d have then relationships as shown below, although they are close to the above relationships. By the way, the AC lamp current has an operation frequency of 100 Hz.

$c/a=1.11$ $a/b=1.19$ $d/a=1.33$

As a result of observing the movement of a cathode luminescent spot while operating the high pressure discharge lamp, it shows that there is no movement of luminescent spot. That means there is no flickering of the brightness or color. Furthermore, the blackening in the translucent discharge lamp is not observed while lighting for 5000 hours. That means the life expectancy of the high pressure discharge lamp is extended.

Returning now to FIGS. 2a to 2e, the second of the AC lamp current waveform, as shown in FIG. 2b differs from the first case, as shown in FIG. 2a in that the instantaneous value in one-eighth period from 90 degree to 135 degree in one-forth period of the second half rises linearly.

Figure 2C:
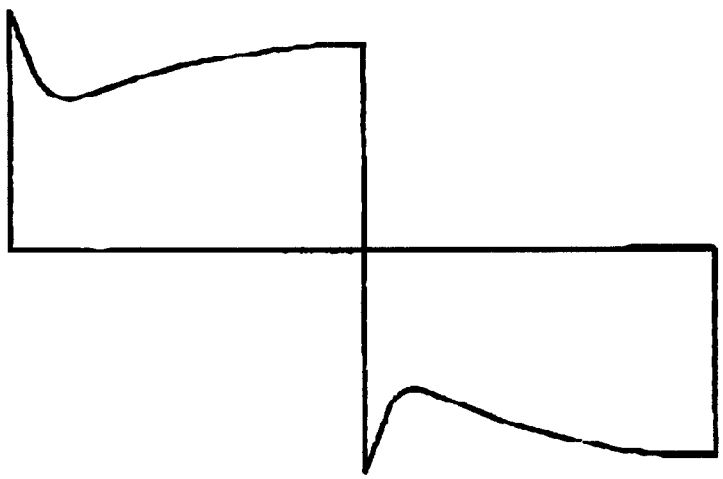

The third aspect of the AC lamp current waveform, as shown in FIG. 2c differs from that, as shown in FIG. 2a in that the instantaneous value rises gently as it is saturated from the minimum value b to the instantaneous value c immediately before polarity change of the first half of each half-cycle period.

Figure 2D:
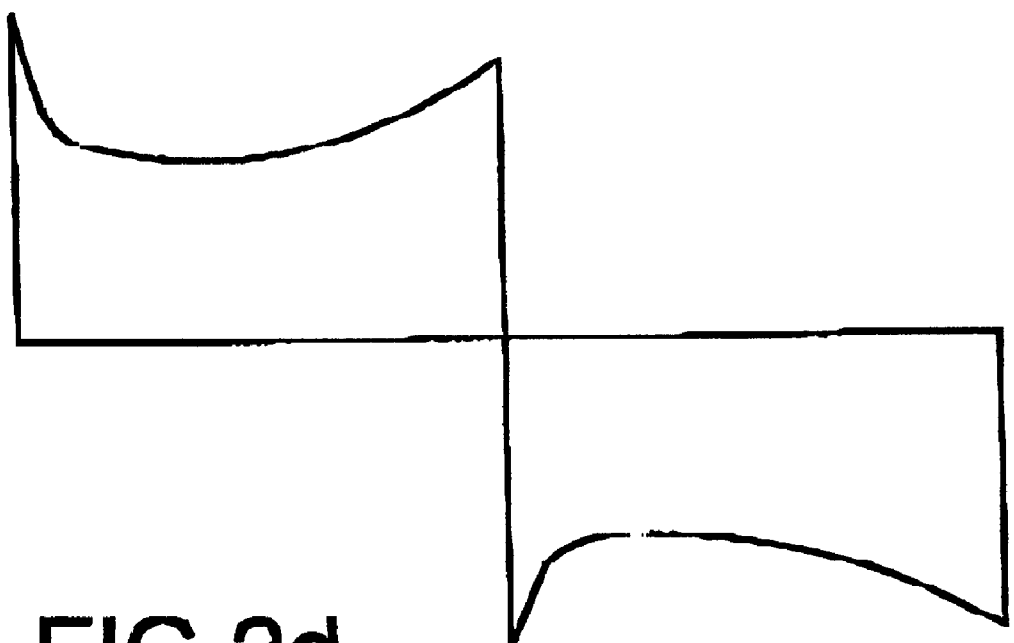

The forth aspect of the AC lamp current waveform, as shown in FIG. 2d differs from the third aspect, as shown in FIG. 2c in that the instantaneous value rises linearly from the minimum value b to the instantaneous value c immediately before the polarity change of the first half of each half-cycle period.

Figure 2E:
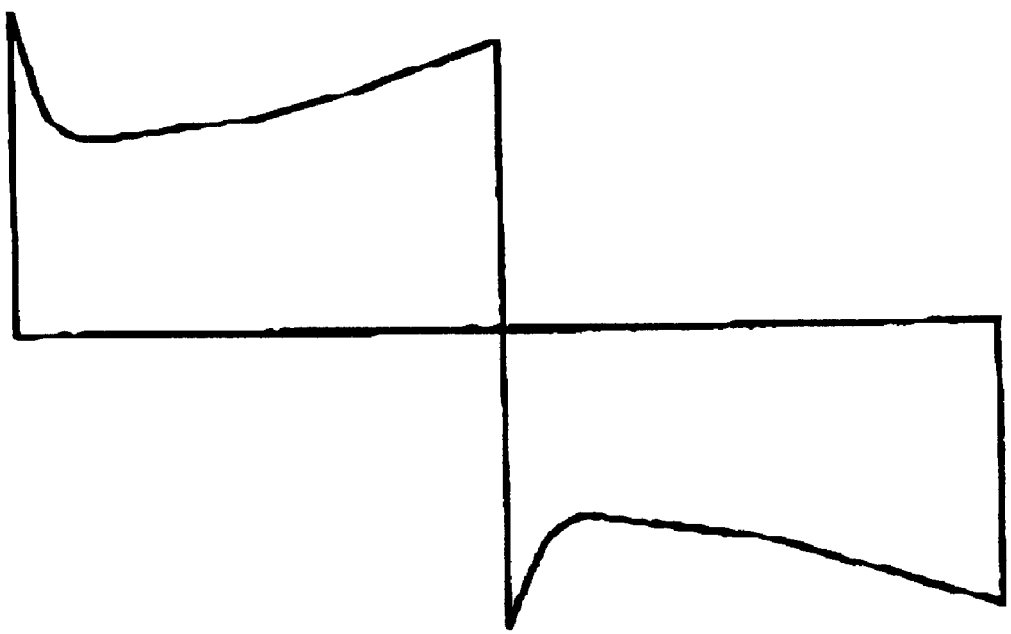

The fifth aspect of the AC lamp current, as shown in FIG. 2e differs from the third and fourth aspects, as shown in FIGS. 2c and 2d in that the instantaneous value rises gradually from the minimum value b to the instantaneous value c immediately before polarity change of the first half of each half-cycle period.

FIGS. 4a to 4d are waveform diagrams showing several aspects of AC lamp current in the second embodiment of the high pressure discharge lamp driving method according to the present invention.

Figure 4A:
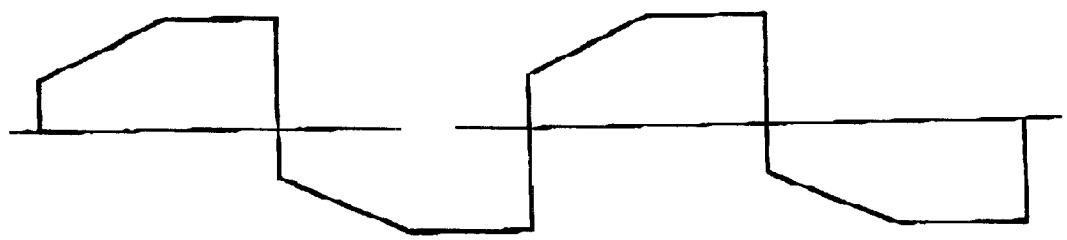
FIGS. 4a to 4d are waveform diagrams showing several acceptable aspects of the AC lamp current in the second embodiment of the high pressure discharge lamp driving method according to the present invention.

The second embodiment differs from the first embodiment in that the high pressure discharge lamp is driven by the AC lamp current which does not have the maximum value immediately after polarity change. That is, FIG. 4a is showing a waveform where the instantaneous value rises linearly of the first half of each half-cycle period and becomes a rectangle-shape in the second half.

Figure 4B:
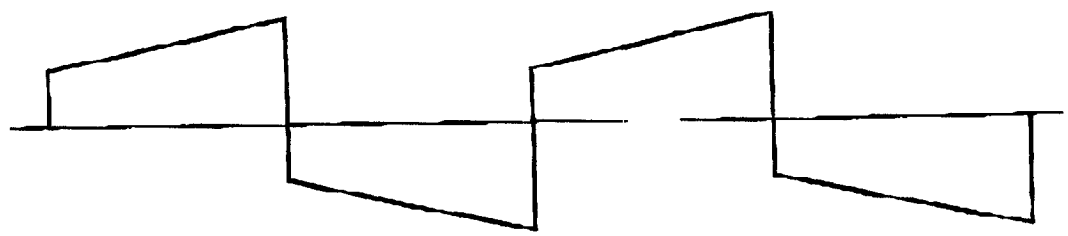

FIG. 4b is showing a waveform where the instantaneous value rises linearly throughout the half-cycle period.

Figure 4C:
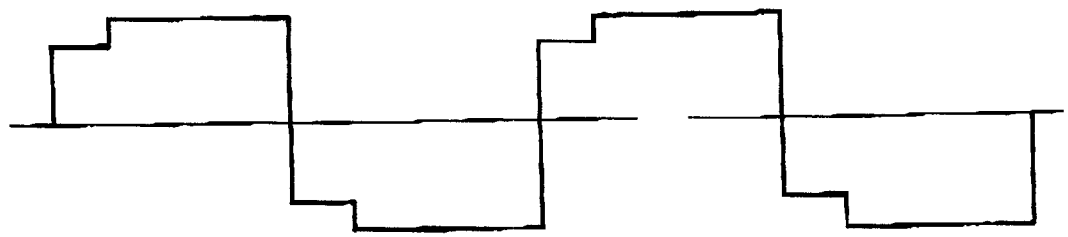

FIG. 4c is showing a waveform where the instantaneous value rises gradually of the first half of each half-cycle period and becomes a rectangular shape in the second half.

Figure 4D:
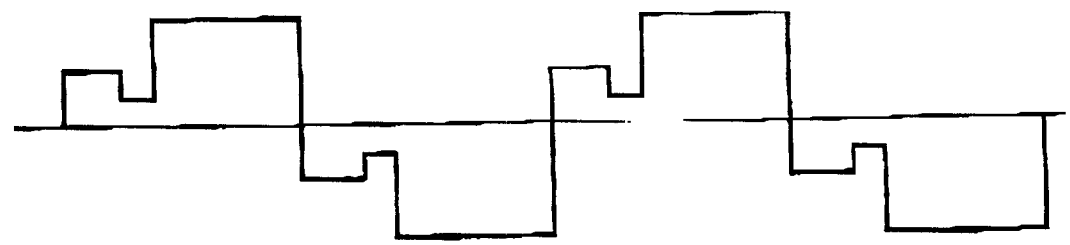

FIG. 4d is showing a waveform where the instantaneous value falls in part in a middle part of the first half of half-cycle period, while it rises gradually before and after the middle part, and it becomes a rectangle-shape in the second half.

Here, the AC lamp current which does not have a maximum value immediately after polarity change is generated by controlling an inrush current by inserting an inductor in the high pressure discharge lamp in series.

Figure 5:
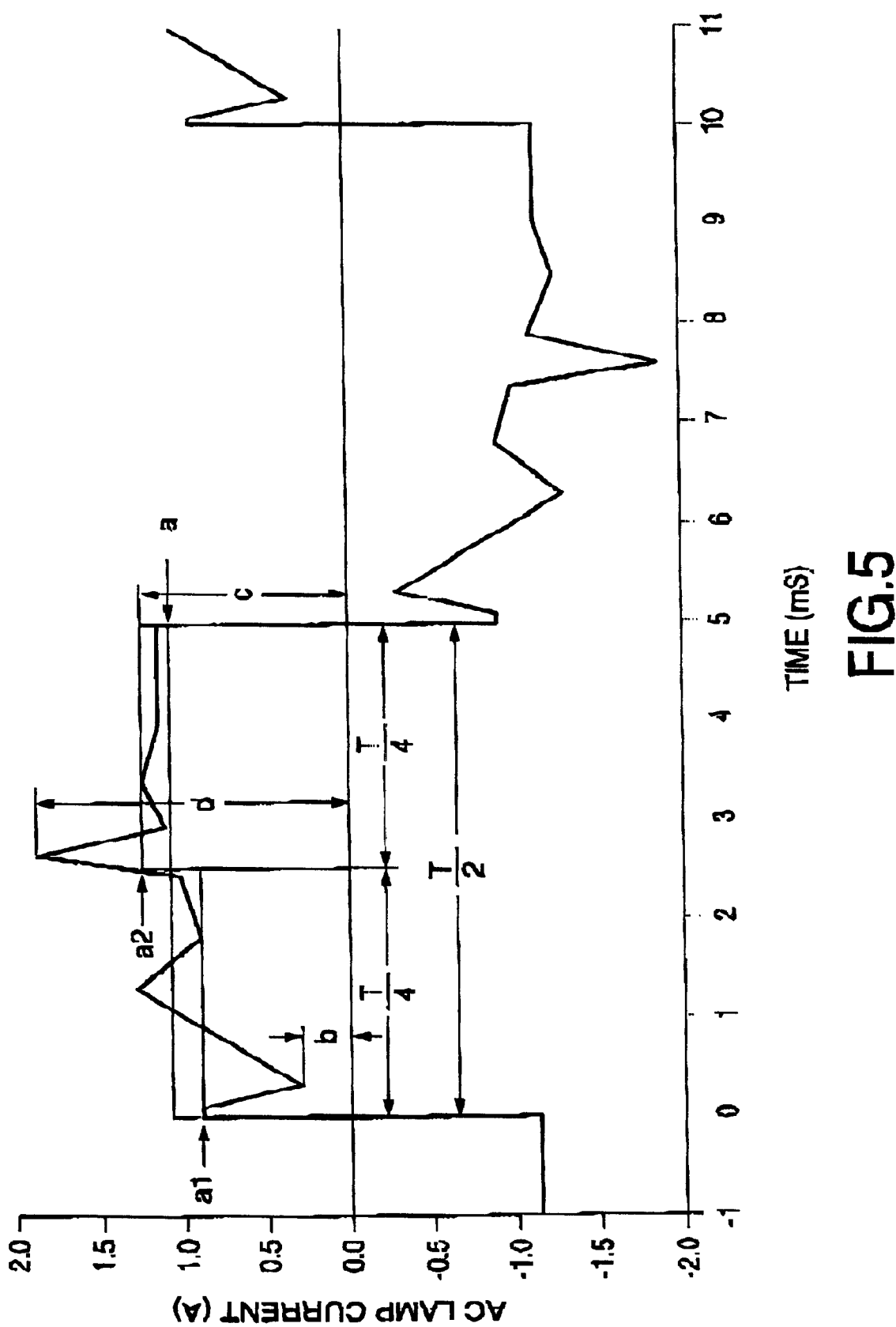
FIG. 5 depicts a waveform diagram showing the AC lamp current in the third embodiment of the high pressure discharge lamp driving method according to the present invention.

FIG. 5 is a waveform diagram showing the AC lamp current waveform of the third embodiment of the high pressure discharge lamp driving method according to the present invention. In FIG. 5, the same elements as those in FIG. 2a are assigned with same marks. This embodiment differs form the first embodiment in that it has the maximum value d around mid term of half-cycle period of the AC lamp current. The mean values a, a1, a2, the minimum value b, the instantaneous value c immediately before polarity change, and the maximum value d have relationships as shown below.

$a2/a1 = 1.44$ $c/a = 1.09$ $a/b = 3.67$ $d/a = 1.58$

Next, in relation to a third embodiment of the high pressure discharge lamp according to the present invention, a result of testing for checking existence of the movement of luminescent spot and the blackening of discharge bulb in the case that the high pressure discharge lamp is operated at different ratios a/b. c/d and d/a by controlling the AC lamp current waveform will be explained referring to Tables 1 through 3. The contents of evaluation of the evaluation signs about the movement of luminescent spot and the blackening in a table will be shown hereinafter.

The movement of luminescent spot.

◯: there is not the movement of luminescent spot

Δ: there is a little movement of luminescent spot

X : there is remarkable movement of luminescent spot

Blackening of Translucent Discharge Bulb.

◎: Blackening had not occurred until 5000 hours of lighting.

◯: Blackening had not occurred until 2000 hours of lighting.

Δ: Blackening had not occurred until 1000 hours of lighting.

X: Blackening has occurred before 500 hours of lighting.

TABLE 1

| a/b | 1.0 | 1.25 | 1.67 | 2.5 | 3.33 | 5.0 |
|---|---|---|---|---|---|---|
| Displacement of Luminescent Spot | Δ | ◯ | ◯ | ◯ | ◯ | ◯ |
| Blackening of Translucent Discharge Bulb | ◎ | ◎ | ◎ | ◯ | ◯ | Δ |

TABLE 2

| c/a | 1.0 | 1.2 | 1.4 | 1.6 | 1.8 | 2.0 |
|---|---|---|---|---|---|---|
| Displacement of Luminescent Spot | x | Δ | ◯ | ◯ | ◯ | ◯ |
| Blackening of Translucent Discharge Bulb | ◎ | ◎ | ◯ | ◯ | Δ | x |

TABLE 3

| c/a | 1.0 | 1.2 | 1.3 | 1.4 | 1.6 | 1.8 | 2.0 |
|---|---|---|---|---|---|---|---|
| Displacement of Luminescent Spot | x | Δ | ◯ | ◯ | ◯ | ◯ | ◯ |

TABLE 3-continued

| c/a | 1.0 | 1.2 | 1.3 | 1.4 | 1.6 | 1.8 | 2.0 |
|---|---|---|---|---|---|---|---|
| Blackening of Translucent Discharge Bulb | ◎ | ◎ | ◎ | ◯ | ◯ | Δ | x |

Figure 6:
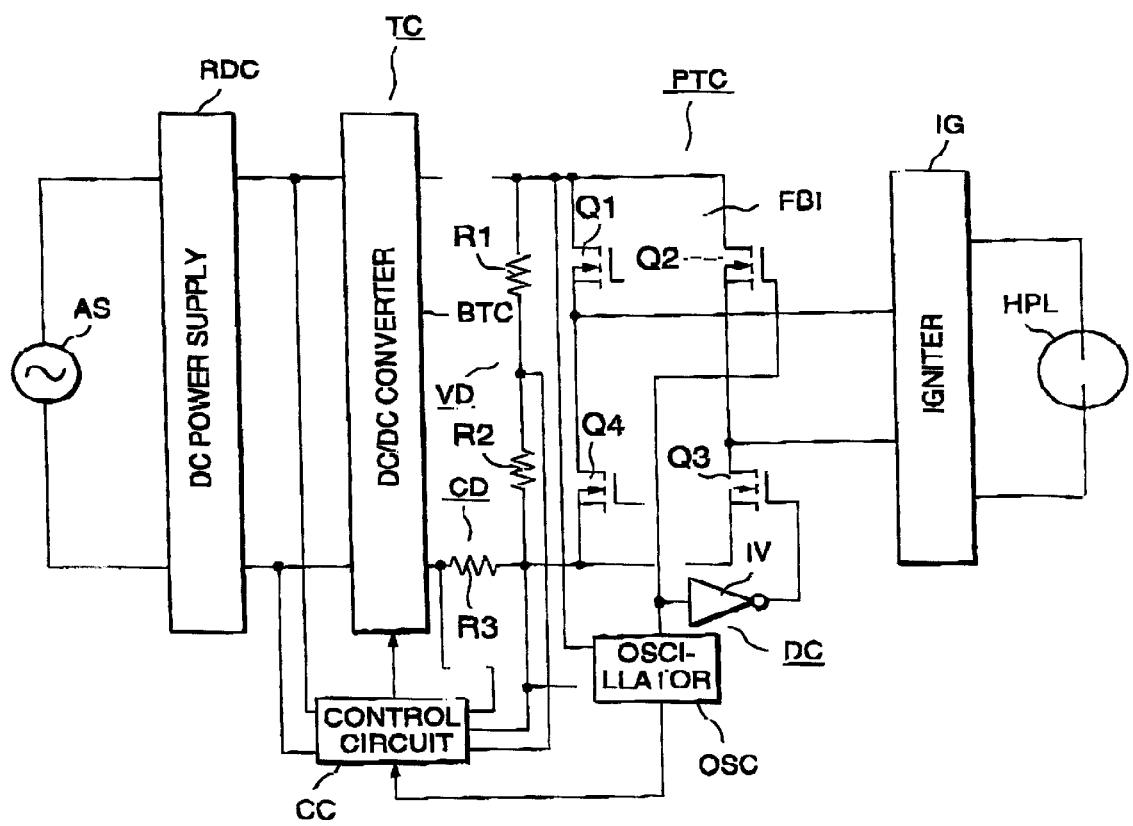
FIG. 6 is a circuit diagram showing a first aspect of the high pressure discharge lamp driving apparatus according to the present invention.

FIG. 6 is a circuit diagram showing the first embodiment of the high pressure discharge lamp driving apparatus according to the present invention. In FIG. 6, AS denotes the AC power supply, RDC denotes a DC power supply, TC denotes a DC to DC converter, PTC denotes a polarity inverter, IG denotes an igniter, and HPL denotes a high pressure discharge lamp.

The circuit arrangement

The AC power supply AS is a commercial AC power supply.

The DC power supply RDC is comprised of a voltage doubler rectifier.

The DC to DC converter TC is comprised of a step-down chopper circuit BTC, a control circuit CC, an output voltage detecting circuit VD, and an output current detecting circuit CV.

The step down-chopper circuit BTC has a known circuit arrangement comprised of a series circuit of an inductor and a switching means and a series circuit of a diode and a smooth capacitor which is connected in parallel to the switching means.

The control circuit CC has some functions such as an oscillation function for forming a driving signal, a memory function for memorize an output characteristic data beforehand in order to have the desirable waveform of the AC lamp current, and an calculating function for calculating the output characteristic data read out of the memory function and each detecting signal from an output voltage detecting circuit VD and an output current detecting circuit CD in order to perform a PWM control to the driving signal. Further, the control circuit CC controls to turn ON or OFF the switching means of the step-down chopper circuit BTC.

The output voltage detecting circuit VD is constituted to control-input the voltage appearing across a resistor R2 in a dividing pressure circuit comprised of a series circuit of resistors R1 and R2 which is coupled across the output terminals of the step-down chopper circuit BTC to the control circuit CC as a feedback signal.

The output current detecting circuit CD is constituted to return-input the voltage appearing across a resistor R3 which is coupled to the output terminal of the step-down chopper circuit BTC in series to the control circuit CC. The control circuit CC controls a DC output synchronizing with a period of the AC lamp current in order to perform a constant-voltage control to the step-down chopper circuit BTC and form a specific AC lamp current.

The polarity inverter PTC is comprised of a full-bridge inverter FBI and a driving circuit DC. The full-bridge inverter FBI is comprised of switching means Q1 through Q4 which are bridged with each other. The driving circuit DC is comprised of an oscillator OSC and an inverter IV. It supplies a driving signal to the switching means Q1 through Q4 and switches alternately two pairs of the switching means Q1, Q3 and Q2, Q4 at a specific operating frequency.

An igniter IG applies a high voltage starting pulse to the high pressure discharge lamp HPL for starting the lamp.

The high pressure discharge lamp HPL has a configuration, as shown in FIG. 1.

The circuit operation

A commercial 100 V AC voltage supplied form the AC power supply AS is converted into a 200V DC voltage, e.g., in the DC power supply RDC, then it is applied to the input terminal of the DC to DC converter TC. In the DC to DC converter TC, the switching means is controlled by the control circuit CC to operate the high frequency switching, so that the DC voltage is chopped and converted into a 50 kHz high frequency pulse one. Then, the duty of the switching is controlled based on the detecting signals of the output voltage detecting circuit VD and the output current detecting circuit DC, so as to perform the constant-voltage-control. Further, by synchronized with the operation of the polarity inverter PTC and calculated based on the output characteristic data memorized beforehand, the duty of the output voltage is controlled, so that the waveform of the half-cycle period of the AC lamp current will have a predetermined characteristics. Furthermore, the pulse voltage is smoothed, and the lowered DC voltage is output.

Next, the lowered DC voltage is applied to the input terminal of the polarity invertor PTC. The polarity inverter PTC outputs an AC lamp current, which is 100 Hz, has a rectangle waveform as its basic waveform, and the waveform of half-cycle period of which is controlled, to its output terminal by the operation of its full-bridge inverter FBI. Then, the AC lamp current is supplied to the high pressure discharge lamp HPL.

The high pressure discharge lamp HPL is driven by the AC lamp current. Here, the inductor contained in the DC to DC converter TC works as a current limiting impedance.

As a result of the operations mentioned above, the AC lamp current supplied to the high pressure discharge lam pat the stable operation will have its waveform of the half-cycle period, as shown in FIG. 3.

Figure 7:
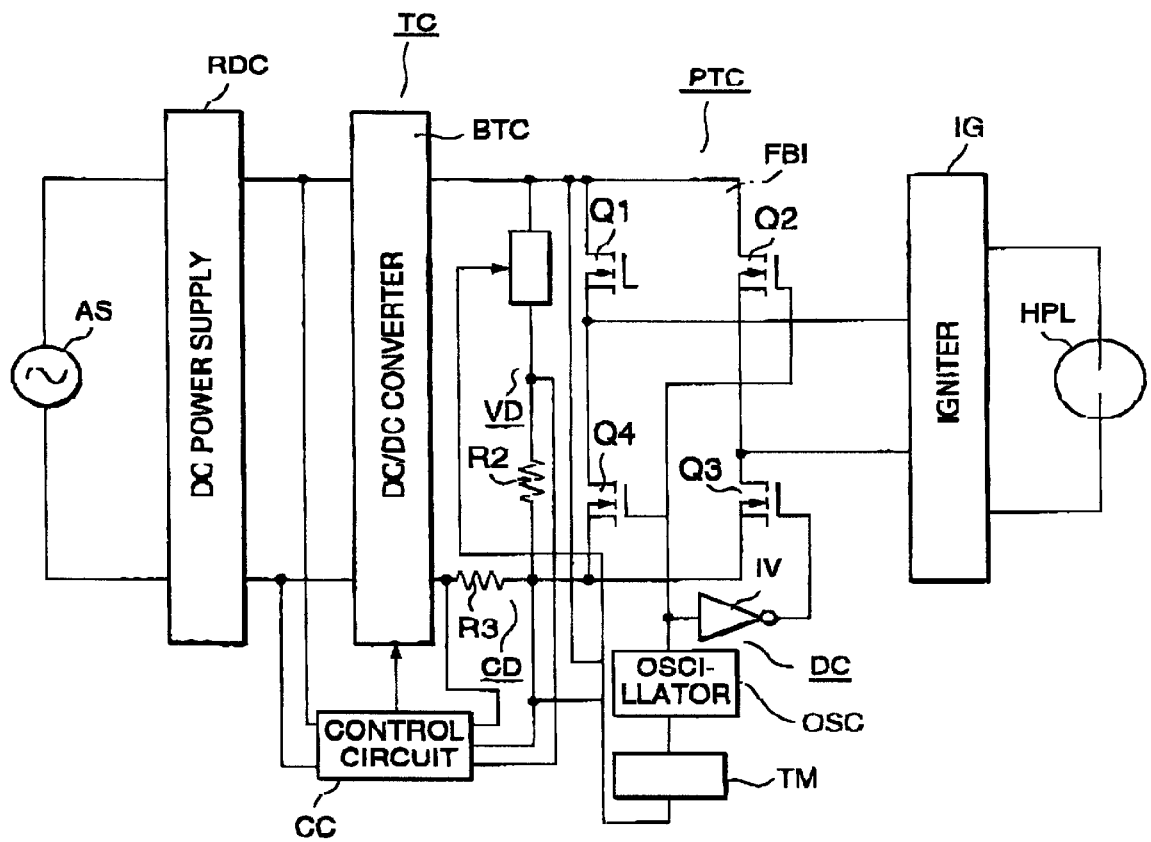
FIG. 7 is a circuit diagram showing a second aspect of the high pressure discharge lamp driving apparatus according to the present invention.

FIG. 7 is a circuit diagram showing the second embodiment of the high pressure discharge lamp driving apparatus according to the present invention.

Figure 8:
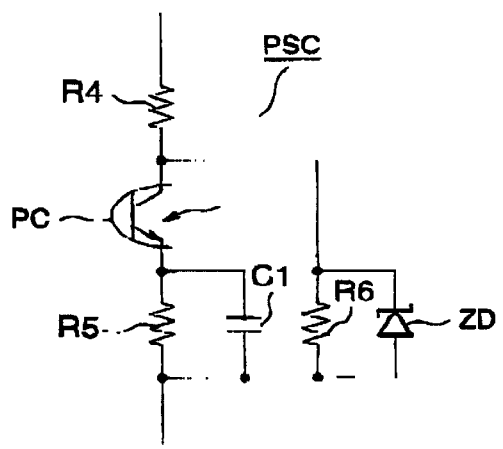
FIG. 8 is a circuit diagram showing a polarity switching/synchronous feedback circuit of the high pressure discharge lamp driving apparatus according to the present invention.

FIG. 8 is a circuit diagram showing in synchronous polarity switching circuit of the high pressure discharge lamp driving apparatus.

In FIGS. 7 and 8, the same elements as those in FIG. 6 are assigned with same marks. This embodiment differs from other embodiments in that it is provided with a suitable circuit arrangement for shaping the waveform of the half-cycle period of the AC lamp current desirably by synchronizing with the operation of the polarity inverter PTC and controlling the output of the DC to DC converter TC.

That is, it is provided with a synchronous polarity switching circuit PSC and a timer TM.

The synchronous polarity switching circuit PSB is coupled in series to the resistor R2 of the output voltage detecting circuit VD and coupled across the output terminals of the DC to DC converter TC. As shown in FIG. 8, the synchronous polarity switching circuit PSB is comprised of a series circuit of a resistor R4, a photo-coupler PC, and a parallel circuit of a resistor R5, a resistor R6 and a Zoner diode ZD which is connected in parallel to the series circuit of the photo-coupler PC and the resistor R5, and a capacitor C1 which is connected in parallel to the resistor R5. The photo-coupler PC is interlocked with a timer TM.

The timer TM performs a timer operation for every half-cycle period of the AC lamp current by synchronizing with the driving circuit DC of the polarity inverter PTC, and it is turned ON at the starting operation in half-cycle period and turned off after one-fourth period. When the timer TM is turned ON, a light emitting diode of the photo-coupler PC is turned ON. When the timer TM is turned OFF, the lighting emitting diode is also turned OFF.

Next, the circuit operation will be explained.

Since the timer TM is interlocked with the driving circuit DC of the polarity inverter PTC, if the polarity of the AC lamp current is reversed, the photo-coupler PC is turned ON for a one-forth period. When the photo-coupler PC is turned ON, the synthetic resistance of the synchronous polarity switching circuit PFB is reduced. In addition, since the capacitor C1 is charged via the resistors R4, R5, and R2, the synthetic resistance is increased gradually according to the charge and is saturated in the end.

Figure 9:
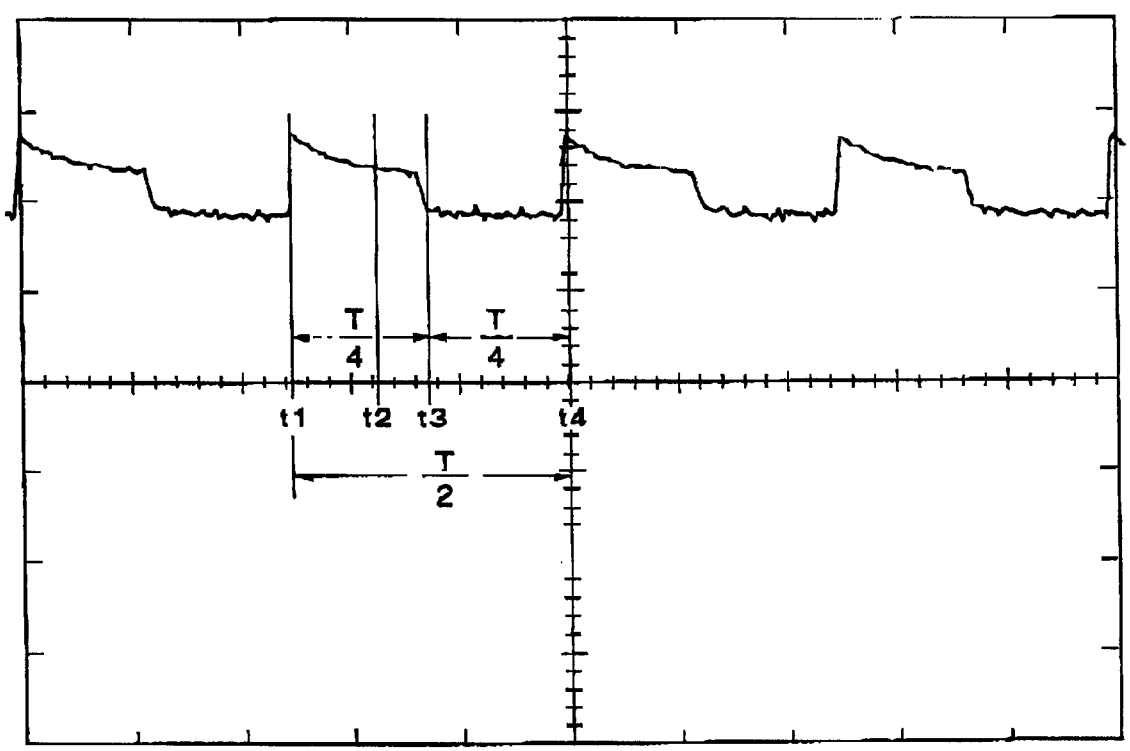
FIG. 9 is a waveform diagram showing a waveform of the output voltage of the output current detecting circuit CD in the second embodiment of the high pressure discharge lamp driving apparatus according to the present invention.

FIG. 9 is a waveform diagram showing the output voltage waveform of the output current detecting circuit CD of the second embodiment of the high pressure discharge lamp driving apparatus according to the present invention. A period between times t1 and t4 equals to the half-cycle period (T/2) of the AC lamp current. The timer TM turns ON for the period from t1 to t3, while it turns OFF for the period from t3 to t4. The capacitor C1 is charged for the period time t1 to t2.

Accordingly, since the photo-coupler PC is turned ON for the first one-forth of the period from t1 to t3 in the half-cycle period of the AC lamp current, the detecting voltage appearing across the resistor R2 of the output voltage detecting circuit VD becomes relatively higher. In addition, the detecting voltage is lowered with time according to the charge of the capacitor C1. Since the detecting voltage is applied to the control circuit CC for controlling as the feedback signal, the on-duty of the high frequency pulse is increased gradually with the charge of the capacitor C1 although the operating function in the control circuit CC commands to reduce the on-duty. As a result, the output of the DC to DC converter TC for the first one-forth of the half-cycle period is increased gradually.

On the other hand, since the photo-coupler PC is turned OFF for the last one-forth of the half-cycle period, the detecting voltage appearing across the resistor R2 is lowered relatively. Thus, the calculate function in the control circuit CC controls the on-duty to be a constant great value. As a result, the output of the DC to DC converter TC for the last one-fourth of the half-cycle period is fixed to a great value. Here, the Zener diode ZD protects the photo-coupler PC from the destruction caused by the impression of overvoltage at the starting operation of the high pressure discharge lamp HPL.

As a result of operations mentioned above, the AC lamp current is controlled, as shown in FIG. 5. Here, in FIG. 6, the pulses at the rising of the half-cycle period and the starting of one-fourth period are caused by the transient phenomenon.

Figure 10:
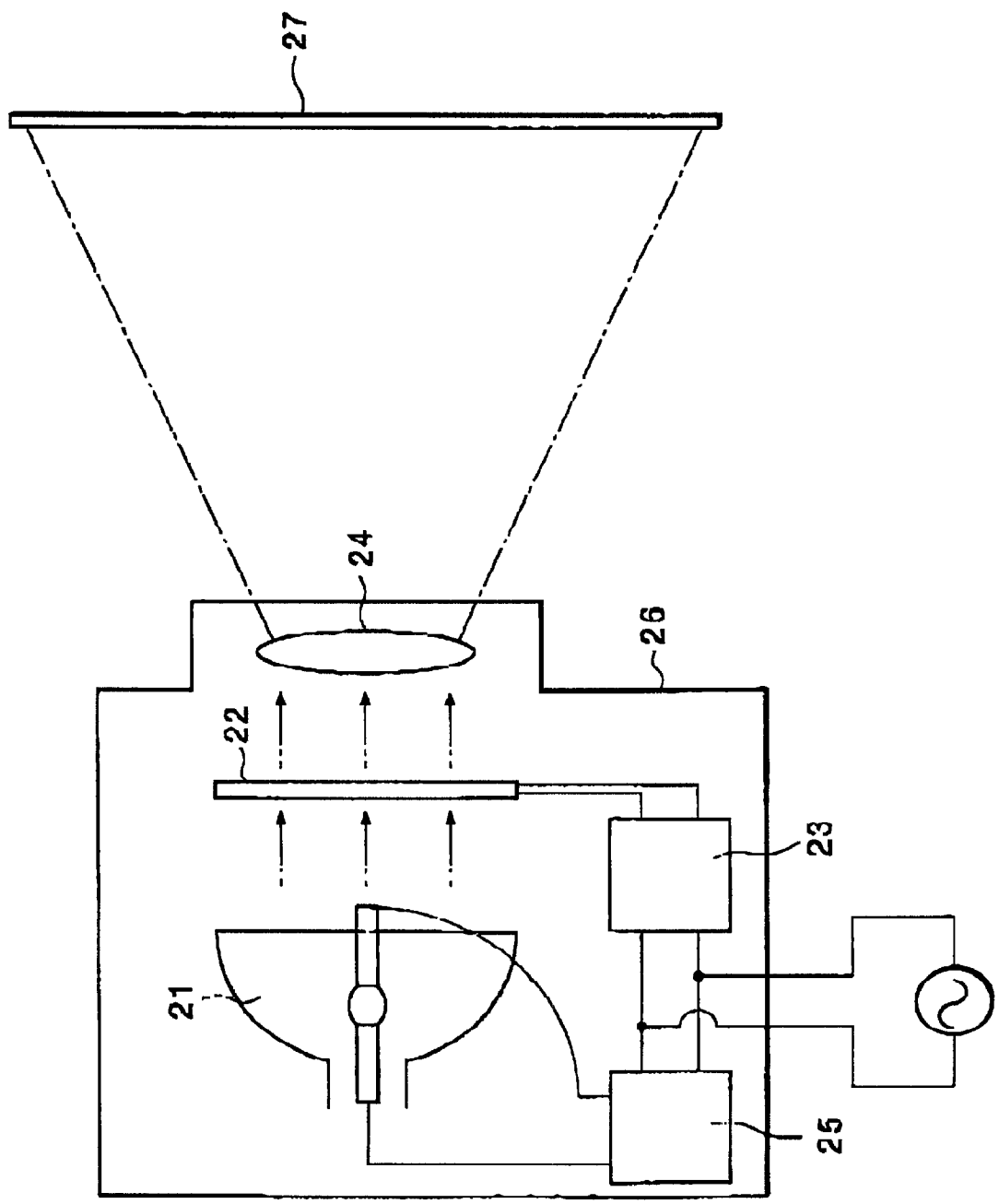
FIG. 10 is a conceptual section of the liquid crystal projector as a first embodiment of the luminaire according to the present invention.

FIG. 10 is a notional section of a liquid crystal projector as the first embodiment of the luminaire according to the present invention.

Figure 11:
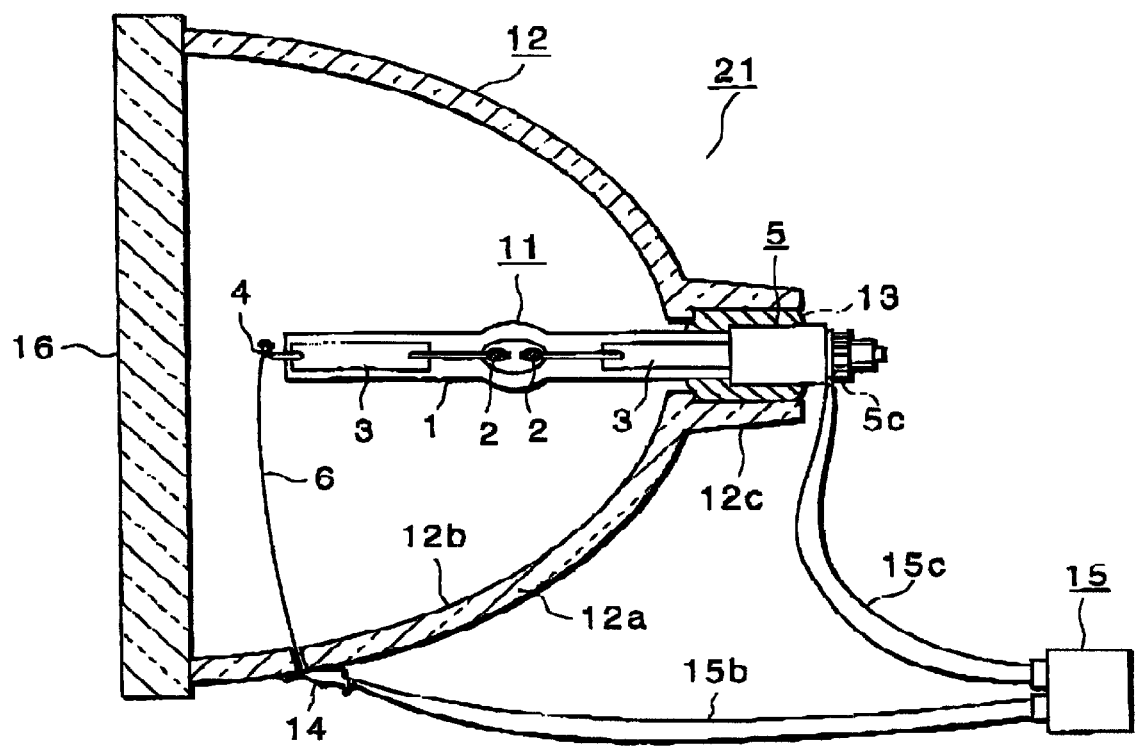
FIG. 11 is a partial section front view showing a luminaire according to the present invention.

FIG. 11 is a partial front section of the high pressure discharge lamp driving apparatus of the luminaire. In FIG. 11, the same elements as those in FIG. 1 are assigned with same marks.

In FIGS. 10 and 11, 21 denotes a high pressure discharge lamp device, 22 denotes a liquid crystal display device, 23 denotes a picture control means, 24 denotes an optical system, 25 denotes a high pressure discharge lamp driving apparatus, 26 denotes a base body housing, and 27 denotes a screen. The high pressure discharge lamp device 21 is constituted as mentioned below. The AC lamp current at the stable operation will be a waveform, as shown in the second embodiment of the present invention in FIG. 5.

The liquid crystal display device 22, which displays images to be projected according to a liquid crystallinity, as illuminated its back by the high pressure discharge lamp device 21 from behind.

The picture control means 23, which is for driving and controlling the liquid crystal display device 22, is able to be provided with a television receiving function, if needed.

The optical system 24 projects light transmitting through the liquid crystal display device 22 on a screen 27.

The high pressure discharge lamp driving apparatus 25 drives the high pressure discharge lamp device 21.

The base body housing 26 accommodates these above-mentioned components 21 through 26 therein.

The high pressure discharge lamp device 21, as shown in FIG. 11, is provided with a high pressure discharge lamp 11, a concave reflecting mirror 12, an inorganic adhesive, a junction terminal 14, a wire harness 15, and a front cover 16. The high pressure discharge lamp 11 is constituted, as shown in FIG. 1. The concave reflecting mirror 12 is comprised of a glass reflector body 12a whose inner surface is shaped in concave, a visible light reflection/heat wave transmission coating 12b, and a cylinder portion 12c. The glass reflector body 12a has a concave surface shaped basically in a paraboloid of revolution and a cylindrical portion 12c protruding outside the top portion thereof. The visible light reflection/heat wave transmission coating 12b is comprised of a dichroic reflection coating.

For mounting the high pressure discharge lamp 11 to the concave reflecting mirror 12, a bulb-base 5 is inserted in the cylinder portion 12c at first. Then, the illuminating center of the high pressure discharge lamp 11 is positioned on the focus of the concave reflecting mirror 12, and the bulb-base 5 and the cylinder portion 12c are fixed by filling the inorganic adhesive 13 between the gap of them. A coupling conductor 6 is welded to a food-conductor 5 on the side of one electrode 2 of the high pressure discharge lamp 11, so as to lead it to the backward of the concave reflecting mirror 12. That is, the coupling conductor 6 is led to the backward of the concave reflecting mirror 12 through a through-hole 12d defined on a part of the mirror surface. The junction terminal 14 is fixed on the outer surface of the concave reflecting mirror 13 near the through-hole 12d. It relays the coupling conductor 6 which is coupled to the high pressure discharge lamp 11 and a wire harness 15.

The wire harness 15 is comprised of a connector 15a and a pair of insulating covered leadwires 15b and 15c. The connector 15 is detachably connected to the output connector of the lamp driving unit (not shown), and also connected to one end of the insulating covered leadwires 15b, 15c. The other end of the insulating covered leadwire 15b is coupled to the junction terminal 14. The other end of the insulating covered leadwire 15c is fastened to a screw terminal 5b of the bulb-base 5 by means of a knurled nut 5c.

The front cover 16, which is comprised of a translucent glass plate, is connected to a front opening of the concave reflecting mirror 12.

When the connector 15a of the wire harness 15 is connected to the lamp driving unit to operate the high pressure discharge lamp 11, the light generated from the high pressure discharges lamp 11 is applied to the visible light reflection/heat wave transmission coating 12b on the concave reflecting mirror 12. The visible light reflects in the direction parallel to the optical axis of the mirror and transmits through the front cover 16 for illumination. On the other hand, since the heat wave is dissipated to the backward of the concave reflecting mirror 12 through the visible light reflection/heat wave transmission coating 12b and the glass reflector body 12a, it is able to control a temperature rising such as a liquid crystal display.

Figure 12:
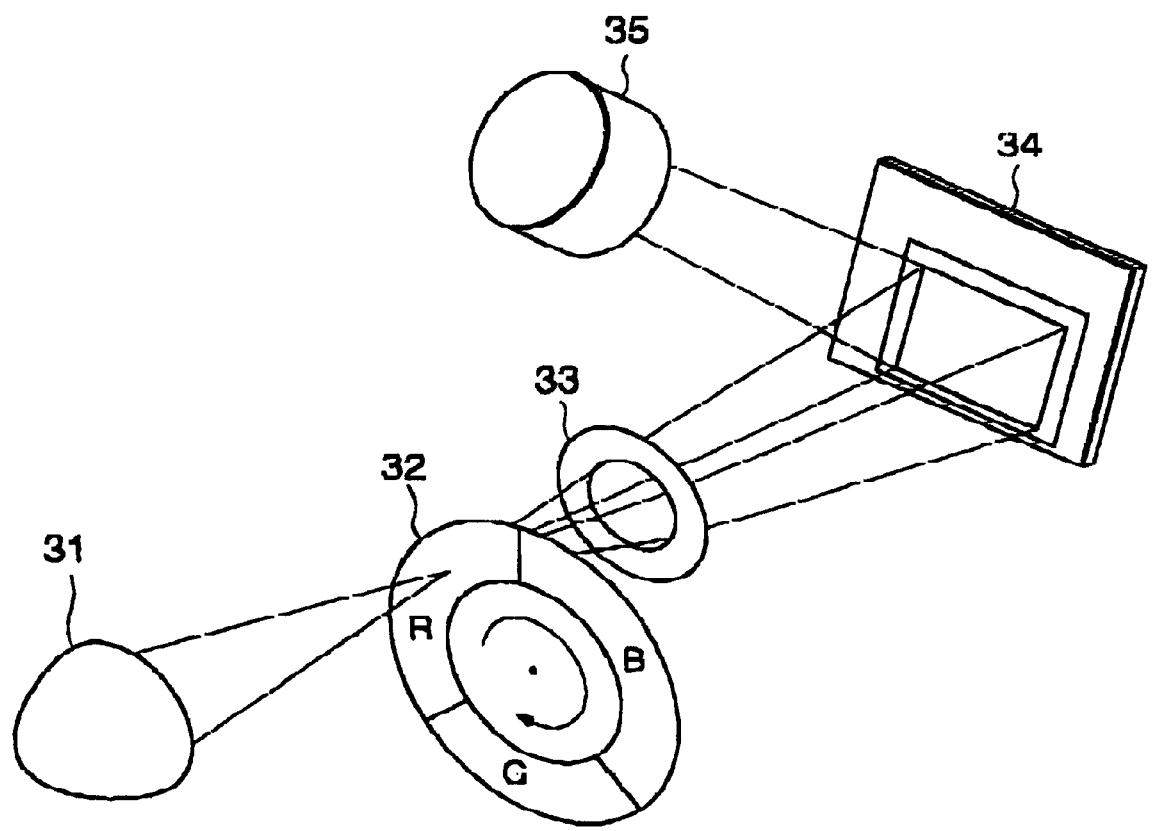
FIG. 12 is a conceptual perspective view showing the optical system of the projector in the digital light processing system as a second embodiment of the luminaire according to the present invention.

FIG. 12 is a conceptual perspective view showing the optical system of the projector in the digital light processing system as the second embodiment of the luminaire according to the present invention.

The optical system of the projector is comprised of a high pressure discharge lamp device 31, a revolving color filter 32, a condenser lens 33, a digital micro-mirror device 34, and a projection lens 35.

The high pressure discharge lamp device 31 basically has same configuration as those shown in FIG. 11, and it works as a light source. The AC lamp current at the state illumination will have a waveform shown in the first embodiment of the present invention shown in FIG. 3.

The revolving color filter 32, which is comprised of an R (red), G (green) and B (blue) tricolor filter wherein R, G and B filters are arranged in a disc-shape in intervals of 120 degree acute angles, is placed on the position focusing the condensed lights from the high pressure discharge lamp device 31, and it is rotated with high speed by the rotating function (not shown.13). Accordingly, the light transmitting through the revolving color filter 32 is timeshared to R, G and B.

The condenser lens 33 applies the R, G and B timeshared lights to a digital micro-mirror device 34.

The digital micro-mirror device 34, which is constituted by an array of multiple micro-mirrors which are individually displaced mechanically in response to picture signals. The digital micro-mirror device 34 thus reflects the incident light to the micro-mirror through the condenser lens 33 in the predetermined direction or other directions. Each micro-mirror constitutes one pixel of a picture.

The projections lens 35 projects the light, i.e., color pictures reflected in the predetermined direction from the digital micro-mirror device 34 on a screen.

Accordingly, the present invention has a great advantage of providing a high pressure discharge lamp driving apparatus which is able to effectively decrease the fluctuation of emitted light in half-cycle period of the lamp current, so as to control flickering of the output amounts of light, a luminaire utilizing the high pressure discharge lamp driving apparatus and a high pressure discharge lamp driving apparatus.

While there have been illustrated and described what are at present considered to be suitable embodiments of the present invention, it will be understood by those skilled in the art that various changes and modifications may be made, and equivalents may be substituted for elements thereof without departing from the true scope of the present invention. In addition, many modifications may be to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A high pressure discharge lamp driving apparatus for driving a high pressure discharge lamp during a stable operation thereof with an AC lamp current alternating for opposite half-cycle periods, the apparatus comprising:
   an AC lamp current supply for supplying the AC lamp current to the high pressure discharge lamp;
   a detector for detecting the output AC lamp current to the high pressure discharge lamp;
   a controller responsive to the detector for controlling the AC supply to output the AC lamp current with a waveform which is characterized by that;
   (i) a mean value in the second half of each half-cycle period is larger than the means value of the first half of each half-cycle period;
   (ii) no pulse current is contained in the second half of each half-cycle period;
   (iii) the AC lamp current has a maximum value immediately after polarity change between the positive and negative half-cycle periods; and
   (iv) the AC lamp current has also a waveform defined by that the ratio (d/a) of the maximum value (d) of the AC lamp current and a mean value (a) of the AC lamp current in its each half-cycle period satisfies a following equation;

$$1.05 \leq d/a \leq 1.80.$$

2. A high pressure discharge lamp driving apparatus as claimed in claim 1, wherein an AC lamp current has the maximum value immediately after the polarity change.

3. A high pressure discharge lamp driving apparatus as claimed in claim 1, wherein an AC lamp current has the minimum value in the first half of each half-cycle period of the AC lamp current.

4. A high pressure discharge lamp driving apparatus for driving a high pressure discharge lamp during a stable operation thereof with an AC lamp current alternating for opposite half-cycle periods, the apparatus comprising:
   an AC lamp current supply for supplying the AC lamp current to the high pressure discharge lamp;
   a detector for detecting the output AC lamp current to the high pressure discharge lamp;
   a controller responsive to the detector for controlling the AC supply to output the AC lamp current with a waveform which is characterisized by that;
   (i) a mean value in the second half of each half-cycle period is larger than the means value of the first half of each half-cycle period;
   (ii) no pulse current is contained in the second half of each half-cycle period;
   (iii) the AC lamp current has a maximum value immediately after polarity change between the positive and negative half-cycle periods; and
   (iv) the AC lamp current has also a waveform defined by that the ratio (a/b) of a mean value (a) of the AC lamp current in its half-cycle period and the minimum value (b) satisfies a following equation;

$$1.1 \leq a/b \leq 4.0.$$

5. A high pressure discharge lamp driving apparatus for driving a high pressure discharge lamp during a stable operation thereof with an AC lamp current alternating for opposite half-cycle periods, the apparatus comprising:
   an AC lamp current supply for supplying the AC lamp current to the high pressure discharge lamp;
   a detector for detecting the output AC lamp current to the high pressure discharge lamp;
   a controller responsive to the detector for controlling the AC supply to output the AC lamp current with a waveform which is characterized by that;
   (i) a mean value in the second half of each half-cycle period is larger than the means value of the first half of each half-cycle period;
   (ii) no pulse current is contained in the second half of each half-cycle period;
   (iii) the AC lamp current has a maximum value immediately after polarity change between the positive and negative half-cycle periods; and
   (iii) the AC lamp has also a waveform defined by that the ratio (c/a) of an instantaneous value (c) of the AC lamp current immediately before its polarity change and a mean value (a) of the AC lamp current in its half-cycle period satisfies a following expression;

$$1.1 \leq c/a \leq 1.5.$$

6. A high pressure discharge lamp driving apparatus as claimed in any one of claims 4 and 5, wherein an AC lamp current has the maximum value around the center of each half-cycle period.

7. A high pressure discharge lamp driving apparatus as claimed claim 6, wherein the ratio (d/a) of the maximum value (d) of the AC lamp current and a mean value (a) of the AC lamp current in its each half-cycle period satisfies a following equation;

$$1.1 \leq c/a \leq 1.5.$$

8. A luminaire, comprising:
   a luminaire main body, and
   a high pressure discharge lamp driving apparatus as claimed in any one of claims 1, 4 and 5, which is mounted on the luminaire main body.

9. A high pressure discharge lamp driving method, comprising driving of the high pressure discharge lamp during a stable operation thereof with an AC lamp current alternating for opposite half-cycle periods, characterized by that;
   (i) a mean value in the second half of each half-cycle period is larger than the means value of the first half of each half-cycle period;
   (ii) no pulse current is contained in the second half of each half-cycle period;
   (iii) the AC lamp current has a maximum value immediately after polarity change between the positive and negative half-cycle periods; and
   (iv) the AC lamp current has also a waveform defined by that the ratio (d/a) of the maximum value (d) of the AC lamp current and a mean value (a) of the AC lamp current in its each half-cycle period satisfies a following equation;

$$1.05 \leq d/a \leq 1.80.$$

10. A high pressure discharge lamp driving apparatus as claimed in claim 9, wherein an AC lamp current has the maximum value immediately after the polarity change.

11. A high pressure discharge lamp driving apparatus as claimed in claim 9, wherein an AC lamp current has the minimum value in the first half of each half-cycle period of the AC lamp current.

12. A high pressure discharge lamp driving method, comprising driving of the high pressure discharge lamp during a stable operation thereof with an AC lamp current alternating for opposite half-cycle periods, characterized by that;

(i) a mean value in the second half of each half-cycle period is larger than the means value of the first half of each half-cycle period;

(ii) no pulse current is contained in the second half of each half-cycle period;

(iii) the AC lamp current has a maximum value immediately after polarity change between the positive and negative half-cycle periods; and (iv) the AC lamp current has also a waveform defined by that the ratio (a/b) of a mean value (a) of the AC lamp current in its half-cycle period and the minimum value (b) satisfies a following equation;

$$1.1 \leq a/b \leq 4.0.$$

13. A high pressure discharge lamp driving method, comprising driving of the high pressure discharge lamp during a stable operation thereof with an AC lamp current alternating for opposite half-cycle periods, characterized by that;

(i) a mean value in the second half of each half-cycle period is larger than the means value of the first half of each half-cycle period;

(ii) no pulse current is contained in the second half of each half-cycle period;

(iii) the AC lamp has also a waveform defined by that the ratio (c/a) of an instantaneous value (c) of the AC lamp current immediately before its polarity change and a mean value (a) of the AC lamp current in its half-cycle period satisfies a following expression;

$$1.1 \leq c/a \leq 1.5.$$

14. A high pressure discharge lamp driving method as claimed in any one of claims 12 and 13, wherein an AC lamp current has the maximum value around the center of each half-cycle period.

15. A high pressure discharge lamp driving method as claimed claim 14, wherein the ratio (d/a) of the maximum value (d) of the AC lamp current and a mean value (a) of the AC lamp current in its each half-cycle period satisfies a following equation;

$$1.1 \leq c/a \leq 1.5.$$

* * * * *